Sept. 30, 1958     F. J. MARGIDA     2,854,016
SAFETY VALVE FOR HYDRAULIC BRAKE SYSTEMS
Filed Dec. 27, 1954
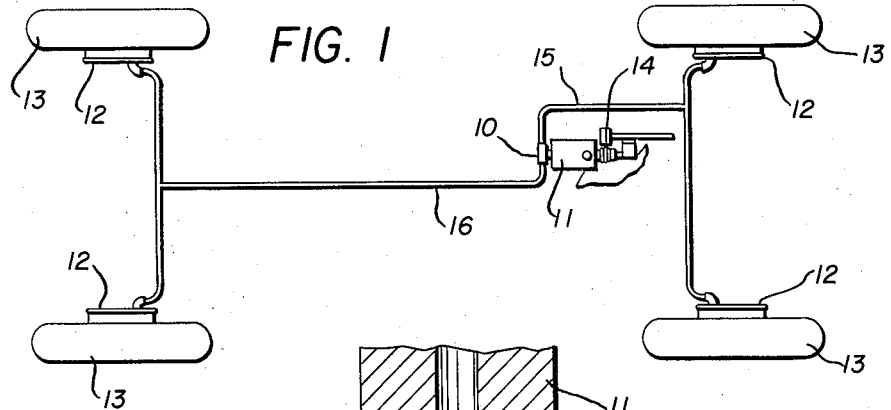
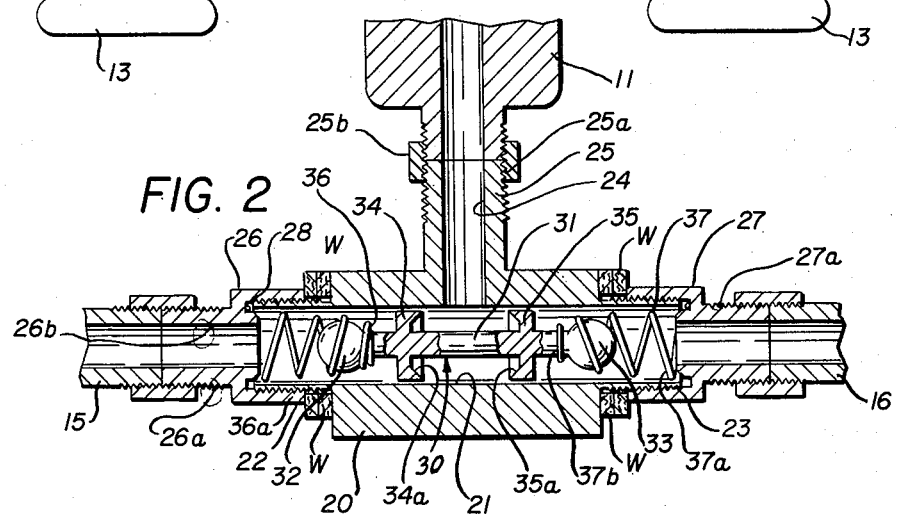
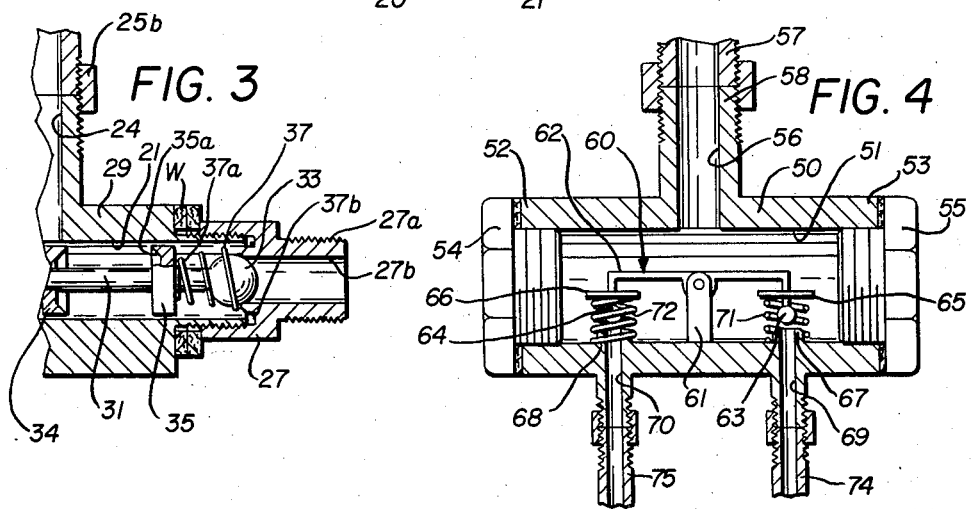
INVENTOR.
FRANK J. MARGIDA
BY
ATTORNEY

United States Patent Office 2,854,016
Patented Sept. 30, 1958

2,854,016

SAFETY VALVE FOR HYDRAULIC BRAKE SYSTEMS

Frank J. Margida, Akron, Ohio, assignor to Saf-T-Brake Valve Co., Inc., Akron, Ohio, a corporation of Ohio Application December 27, 1954, Serial No. 477,668

5 Claims. (Cl. 137—118)

This invention relates to hydraulic control systems and in particular, relates to safety mechanisms for hydraulic brake systems for automobiles.

In the past, hydraulic systems have been extensively employed in connection with the braking system of an automobile. These hydraulic systems, in essence, operate to convey pressurized fluid from a central source of supply to individual pistons that are respectively provided in the individual brake drums of one or more wheels of the automobile. In this manner, the expansion of any one piston upon pressurizing of the fluid by a master cylinder, for example, will cause the brake shoe to be pivoted into braking engagement with the relatively rotatable braking surface that is provided on the wheel, and in this manner an effective and efficient braking action is obtained.

While the above type of hydraulic system has proved satisfactory in operation over the past several years it has been well known that the same is inherently dangerous in operation, in view of the fact that a single leak in any one conduit thereof can cause, in a matter of seconds, a complete loss of braking action, due to the immediate dissipation of the hydraulic brake fluid through the ruptured area. With the loss of the brake fluid as just described, depression of the brake pedal, that would normally result in subsequent actuation of the master cylinder, will merely operate to pump the pressurized brake fluid through the ruptured area; and accordingly, the individual pistons will not be supplied with the required braking fluid necessary to cause the braking action in the individual wheels. There is no warning of such loss of brake fluid; and accordingly, the operator of the automobile is first apprised of such a brake failure when he or she attempts to brake the auto by depressing the usual foot pedal.

Several proposed devices have been advanced in the past several years to provide a factor of safety against the possibility of such a brake failure as has been above described. Without exception, these structures have been of a complex, and accordingly, expensive nature, with the result that the commercial acceptance of such devices has been limited at the present time. In addition to the cost element just discussed, the known prior art type of safety devices for hydraulic brake systems, are further disadvantageous in that the inherent complexity of the same defeats the ultimate purpose thereof, in view of the fact that the purported safety devices are so delicate that the mechanisms thereof are invariably jarred or otherwise disturbed so as to be inoperative at such time as needed. Thus, while the prior art devices may be operable upon initial installation, a brake failure might not occur for several months, and during this period in which the hydraulic brake system was operating satisfactorily, the delicate mechanism of the known prior art would be jarred or otherwise rendered inoperable, with the result that at such time as a brake failure did occur, the alleged safety device would be unable to operate to avoid the consequences of such a failure.

Accordingly, it is one object of this invention to provide a safety device for hydraulic control systems.

It is a further object of this invention to provide a safety device for hydraulic control systems that includes a minimum number of component parts, and is accordingly efficient in operation and maintenance.

It is a still further object of this invention to provide a low cost safety device for the hydraulic braking systems of automobiles that is characterized by the absence of delicate adjustment parts with the result that the operation thereof is extremely simple and efficient.

It is a still further object of this invention to provide a safety device for hydraulic braking systems that will automatically resume its position after the rupture in the hydraulic fluid line has been repaired; and accordingly, does not involve a resetting operation.

These and other objects of the invention will become more apparent upon a reading of the following brief specification, considered and interpreted in the light of the accompanying drawings.

Of the drawings:

Figure 1 is a plan view illustrating schematically a hydraulic braking system for automobiles that is equipped with the improved safety device of this invention.

Figure 2 is a sectional view illustrating the position of the component parts of the safety device in the normal position of use.

Figure 3 is a view similar to Figure 2, but being broken away and illustrating the position of the component parts when a failure has occurred in one brake line.

Figure 4 is a sectional view illustrating a modified form of the invention.

Referring now to the drawings, and in particular, to Figure 1 thereof, the improved safety device, generally designated as 10, is illustrated as being positioned to prevent the loss of braking fluid between a master cylinder 11 and a plurality of brake drums 12, 12 that are provided on wheels 13, 13, the usual foot pedal 14 being employed to actuate the master cylinder 11. Accordingly, the safety device 10 is shown positioned so as to interconnect the master cylinder 11 and the fluid lines 15 and 16 that respectively lead towards the front and rear wheel braking systems of the automobile.

As best illustrated in Figures 2 and 3 of the drawings, the safety device 10 includes a T-shaped valve body 20 that has an axial bore 21 thereof interconnecting the axially spaced ends 22 and 23 thereof, while a second bore 24 interconnects the bore 21 with a valve end 25 that is externally threaded as at 25a for reception of the usual fitting 25b that interconnects the valve end 25 with the master cylinder 11. By like token, the valve ends 22 and 23 are externally threaded as at 22a, 23a, to permit respective reception thereon of cap members 26, 27; the usual packing washers W, W being employed to prevent leakage between the just described parts. Each cap 26, 27, in addition to including external threads 26a, 27a, is further defined by axial bores 26b, 27b that are axially aligned with the main axial bore 21 of the valve body 20. Additionally, the caps 26 and 27 further include annular seats 28, 29, respectively, that are provided for coaction with a valving element 30, in a manner to be described.

To this end, the valving element 30 is shown as including a central shaft 31 that is disposed axially in the bore 21 and has the opposed axial ends thereof equipped with balls 32, 33 that are capable of seating against the open ends of bores 26b, 27b when the shaft 31 is shifted axially as is the case in a brake failure. For the purpose of initiating such shifting of the shaft 31, the same further includes a pair of spaced discs 34, 35 that are secured to the shaft 31 so as to be movable therewith. Each disc 34, 35 is shown as including a cupped face 34a, 35a, respectively, that operate to improve the pressure-responsive characteristics of the discs 34, 35. Additionally, to the end of permitting passage of fluid between the bore 21 and the discs 34, 35, the external diameter of each disc 34, 35 is shown as being smaller than the diameter of the bore 21, with the result that clearance is provided therebetween for purposes to be described. Preferably, and as shown in the drawings, the discs 34 and 35 are of the same diameter so as to have equal clearance with respect to bore 21.

For the purpose of maintaining the just-described clearance on all peripheral edge portions of each disc 34 and 35, there are provided coil springs 36, 37 that are, in effect, supported between the valve body 20 and the valving means 30; the arrangement being such that the spring 36 has one end 36a seated on the annular seat 28 and has the opposed end 36b thereof received around the shaft 31 between the ball 32 and the disc 34. Similarly, the spring 37 has one end 37a seated against the annular seat 29 and has the opposite end 37b thereof positioned around the shaft 31 between the ball 33 and the disc 35 (see Figure 2). In this manner, the shaft 31 is centered in the bore 21 with equal clearance being maintained at all points between the bore 21 and the respective discs 34 and 35.

In use or operation of the improved safety device 10, the same is first installed in the hydraulic fluid line adjacent the master cylinder 11 as shown in Figure 1, so that the lines 15 and 16 are secured to ends 22 and 23 respectively. In this condition, the shaft 31 is positioned as shown in Figure 2, with the discs 34 and 35 being disposed at approximately equal distances on opposite sides of the bore 24; and during the normal operation of the hydraulic braking system, the shaft 31 will not move axially of the bore 21 because of the equal pressures that are exerted against the discs 34 and 35. In this normal condition, fluid will flow around the clearance provided between the bore 21 and each disc 34 and 35, and will thus be supplied under equal pressure to the lines 15 and 16 for operation of the brake drums 12, 12 that are secured thereto.

However, when a failure occurs in the line 16, for example, it will immediately result in fluid being drained from this line through the ruptured area; and simultaneously with this draining of the fluid there will result a pressure drop in line 16. As a result of this pressure drop, the pressure acting on the cupped surface 35a of the disc 35 will be greater than the pressure in line 16, and this pressure differential will cause the shaft 31 to move to the right of Figure 2 towards the position of Figure 3, at which time the ball 33 will seat on the bore 27b to thus seal off the flow of further fluid into the line 16. In this position of Figure 3, the force of the fluid acting on the ball 33 will maintain the ball 33 in seated relationship with respect to the bore 27b; and the force of the spring 37 will not be sufficient to overcome this pressure which is supplemented by the auxiliary pressure offered against the cup 35. However, when the line 16 has been repaired by first draining line 15, the force of the spring 37 will return the shaft 31 to the position of Figure 2; at which time the lines 15 and 16 may be refilled from master cylinder 11 so that operation can be resumed until another failure occurs.

It will be seen from the foregoing that there has been provided a new and novel safety device for use in minimizing the dangerous effects of a brake failure resulting from rupture of a hydraulic fluid line. The particular safety device embodied has been illustrated in conjunction with the control of fluid in the lines 15 and 16; but it is to be understood that if desired, additional devices could be similarly employed to control the flow of fluid in other portions of fluid lines 15 and 16. It has also been shown how the construction of the safety device is of such a nature as to require a minimum number of parts, and further in this regard, that the parts are of such simplified structure that the same do not require any adjustment or maintenance care.

In Figure 4 of the drawings, there is illustrated a modified form of the invention, similar in every respect to the device of Figures 1 to 3, with the single exception that a different type of valving means is employed to control the fluid flow therethrough. Accordingly, in Figure 4 there is illustrated a T-shaped body 50 having an axial bore 51 extending therethrough to define valve ends 52 and 53 that are provided with threaded plugs 54 and 55. Intermediate the axial bore 51 there is provided a second bore 56 that communicates a conduit 57 with a valve end 58.

The valving mechanism for the valve body 50 is generally designated by the numeral 60 and is shown in Figure 4 of the drawings as including a support 61 around which is pivoted a link arm 62. The opposed ends of the link arm 62 are shown as including spaced balls 63 and 64, as well as pressure responsive discs 65 and 66 that function to make link 62 pressure responsive about the support 61. Directly below the balls 63 and 64, there are provided bosses 67 and 68 that define bores 69 and 70 that respectively interconnect with fluid lines 74, 75, for example. Additionally, the bosses 67 and 68 define a seat support for springs 71 and 72 that respectively contact the balls 63 and 64 so as to normally maintain the same in the position of Figure 4.

In use or operation of this modified form of the invention, fluid entering from conduit 56 normally flows through lines 74 and 75 at equal pressures, due to the fact that the springs 71, 72 maintain the pressure responsive discs 65 and 66 in the position of Figure 4, and this positioning is not disturbed by the equal pressures acting on the discs 65, 66. However, when a pressure break occurs, as for example in the line 74, the pressure therein will be reduced, with the result that the pressure responsive disc 65 will be pivoted on link 62 about support 61, so that the ball 63 seats against the bore 69, with the fluid pressure on the ball 63 retaining the same in this position against the force of spring 71. In this condition, it will be impossible for additional fluid to be dissipated through the rupture in the line 74; and accordingly, the remaining line 75 will not be drained of fluid as a result in brake failure. When the line 74 has been repaired and the system is not pressurized, the spring 71 will urge the ball 63 out of its seating contact with the bore 69, with the result that the link 52 will be returned to the position of Figure 4 for resumption of normal operations. It is to be understood that if desired, the discs 65 and 66 could be provided with cupped faces (not shown) in the manner shown in Figures 1 to 3 of the drawings.

It accordingly follows from the above, that other modifications may be resorted to without departing from the spirit thereof or the scope of the appended claims.

What is claimed is:

1. A control valve of the character described, comprising: a valve body having a main axial passage therethrough defined by port openings of identical size that are provided adjacent the opposed axial ends thereof, and having a second auxiliary passage interconnecting said main passage adjacent the central portion thereof; a valve stem received in said main passage and having identical valve plugs provided adjacent the opposed ends thereof; means for moving said stem with respect to said valve body whereby either said plug may be seated against the port opening adjacent thereto, whereby said port opening will be sealed off; said means including identical pressure responsive discs fixed on said stems and being spaced inwardly from said valve plugs provided on the opposed ends of said stems; equal clearance being provided between said discs and said main passage whereby fluid passing through said passage may flow between the peripheral edges of said discs and said main passage said discs being substantially normal to the axial extent of said valve stem at the point of attachment therewith; said valve stem being freely moveable axially of said axial bore at all times.

2. The device of claim 1 further characterized by the fact that each said disc is provided with a cupped face on one radial surface thereof.

3. A control valve of the character described, comprising; a valve body having a main axial passage therethrough defined by port openings of identical size that are provided adjacent the opposed axial ends thereof, and having a second auxiliary passage interconnecting said main passage adjacent the central portion thereof; a valve stem received in said main passage and having identical valve plugs provided adjacent the opposed ends thereof; means for moving said stem with respect to said passages whereby either said plug may be seated against the port opening adjacent thereto, whereby said port opening will be sealed off; and spring members interposed between each said plug and the port opening adjacent thereto; said means including pressure responsive discs fixed on said stem and being spaced inwardly from said valve plugs provided on the opposed ends of said stem; clearance being provided between said discs and said main passage whereby fluid passing through said passage may flow between the peripheral edges of said discs and said main passage said discs being substantially normal to the axial extent of said valve stem at the point of attachment therewith; said valve stem being freely moveable axially of said axial bore at all times said discs being identical in diameter and said clearance between said discs and said main passage being identical.

4. A control valve of the character described, comprising; a valve body having a main axial bore therethrough defined by port openings provided at the opposed axial ends thereof, and having a second auxiliary passage interconnecting said main passage adjacent the central portion thereof; a valve stem received in said main passage and having opposed ball plugs provided at the opposed ends thereof; means for shifting said stem axially of said main passage, whereby one said ball plug may be seated against said port opening adjacent thereto upon axial shifting of said stem in said main passage; a pair of axially compressible centering springs, each carried by one axial end of said valve stem and interposed between each said port opening and the ball plug adjacent thereto, whereby said stem is normally maintained medianly of said main passage; said means including identical pressure responsive discs fixed on said stem and being spaced inwardly from said ball plugs; said disc having a smaller diameter than said bore whereby clearance is provided between said discs and said bore whereby fluid passing through said passage may flow between the peripheral edges of said discs and said main passage said discs being substantially normal to the axial extent of said valve stem at the point of attachment therewith; said valve stem being freely moveable axially of said axial bore at all times.

5. A brake adjusting device of the character described comprising; a housing defined by an axial bore having opposed outlet ports of equal size and a central inlet port; a valve stem received in said bore in axially shiftable relationship therewith and having identical ball plugs provided at the opposed axial ends thereof; a pair of identical pressure responsive discs carried by said stem in axially spaced relationship with each other and being spaced inwardly of said valve plugs adjacent the opposed ends of said stem; and a pair of spring members respectively interposed between each said outward port and each said plug whereby said valve stem is normally centered axially of said bore; each said disc being uniformly smaller in diameter than said bore whereby equal amounts fluid from said inlet port may flow past the peripheral edges of each said disc said discs being substantially normal to the axial extent of said valve stem at the point of attachment therewith; said valve stem being freely moveable axially of said axial bore at all times.

References Cited in the file of this patent

UNITED STATES PATENTS

| 1,588,657 | Christensen | June 15, 1926 |
| 2,266,921 | Trautman | Dec. 23, 1941 |
| 2,466,485 | Schultz | Apr. 5, 1949 |
| 2,534,871 | Lichtman | Dec. 19, 1950 |

FOREIGN PATENTS

| 135,398 | Sweden | Apr. 22, 1952 |